US006681194B2

(12) United States Patent
Doel et al.

(10) Patent No.: US 6,681,194 B2
(45) Date of Patent: Jan. 20, 2004

(54) METHOD OF SETTING A TRIGGER POINT FOR AN ALARM

(75) Inventors: David Lacey Doel, Maineville, OH (US); Ty Brandon Dubay, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 87 days.

(21) Appl. No.: 10/036,576

(22) Filed: Dec. 21, 2001

(65) Prior Publication Data

US 2003/0120452 A1 Jun. 26, 2003

(51) Int. Cl.[7] .............................................. G06F 15/00
(52) U.S. Cl. ..................................................... 702/127
(58) Field of Search .......................... 702/127; 342/70; 382/155; 343/5; 328/165; 364/480

(56) References Cited

U.S. PATENT DOCUMENTS

| 4,586,043 A | 4/1986 | Wolf | 343/5 CF |
| 5,018,215 A * | 5/1991 | Nasr et al. | 382/155 |
| 5,204,631 A | 4/1993 | Hobbs | 328/165 |
| 5,337,251 A | 8/1994 | Pastor | 364/484 |
| 2002/0003488 A1 * | 1/2002 | Levin et al. | 342/70 |

* cited by examiner

*Primary Examiner*—John Barlow
*Assistant Examiner*—Tung Lau
(74) *Attorney, Agent, or Firm*—William Scott Andes; Barbara Joan Haushalter

(57) ABSTRACT

An approach to setting an alarm limit, which triggers an alarm when a measurement signal reaches the limit. As an example, when a measurement signal is obtained indicating a temperature, the measurement signal can be contaminated with artifacts such noise. The artifacts can falsely indicate that the temperature exceeds a limit, thereby producing false alarms. The invention reduces the number of false alarms, by (1) predicting the likelihood of false alarms for various limits, (2) specifying a desired likelihood, and (3) selecting and using the limit that produces the desired likelihood.

5 Claims, 5 Drawing Sheets

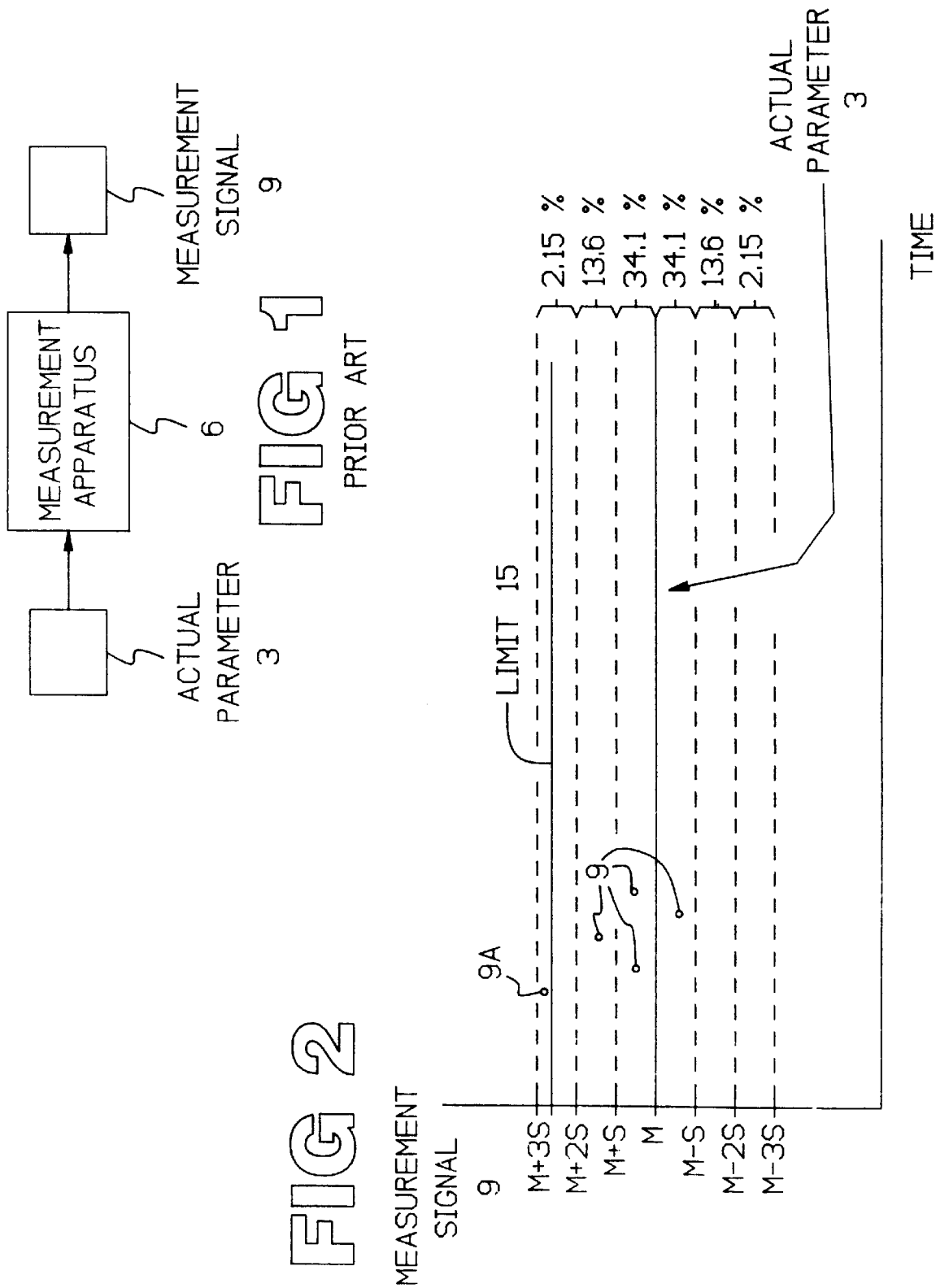

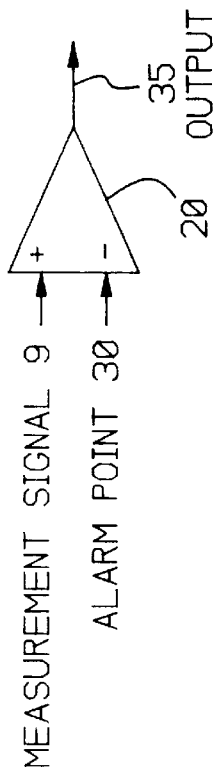
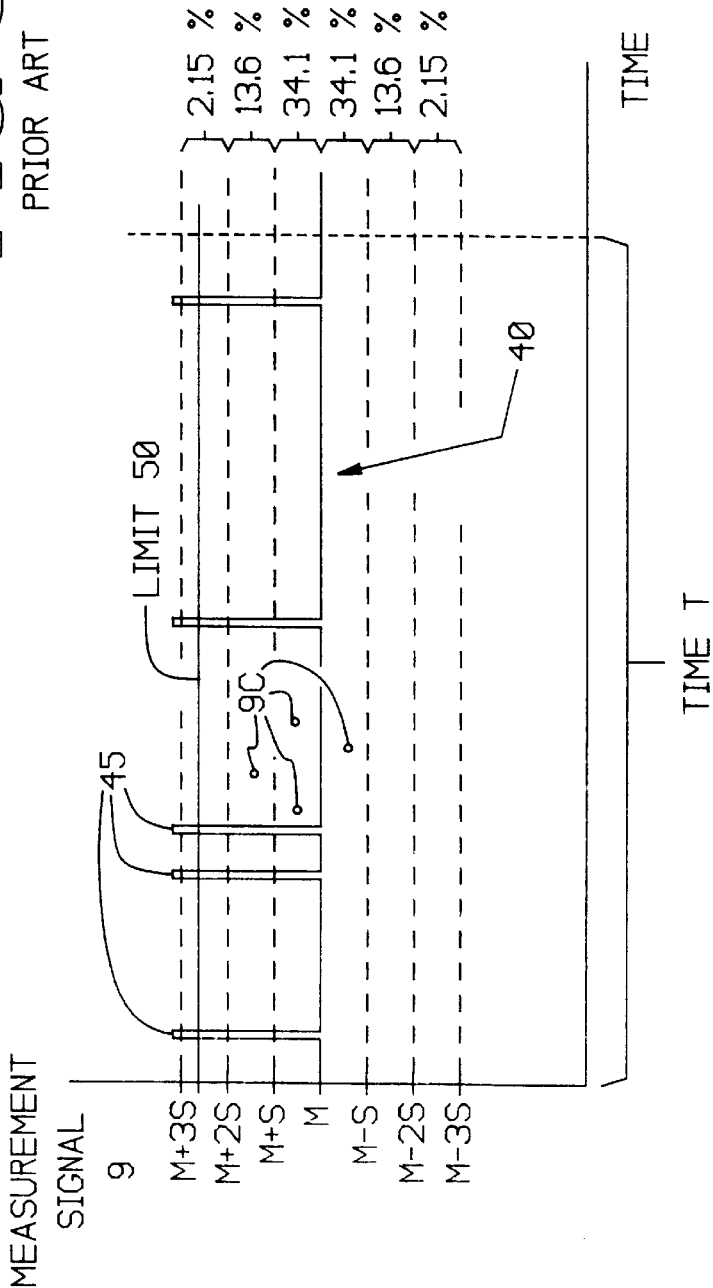

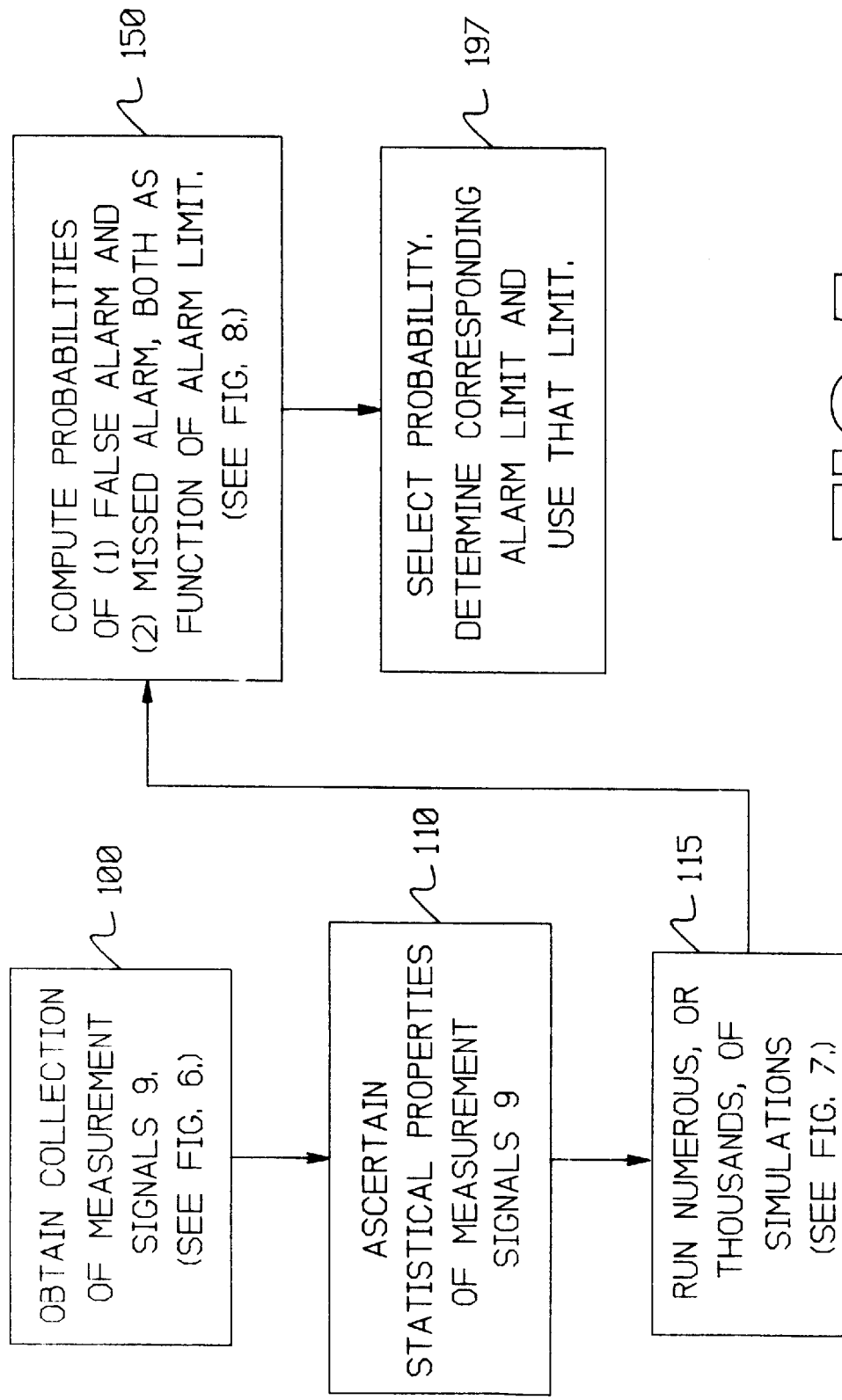

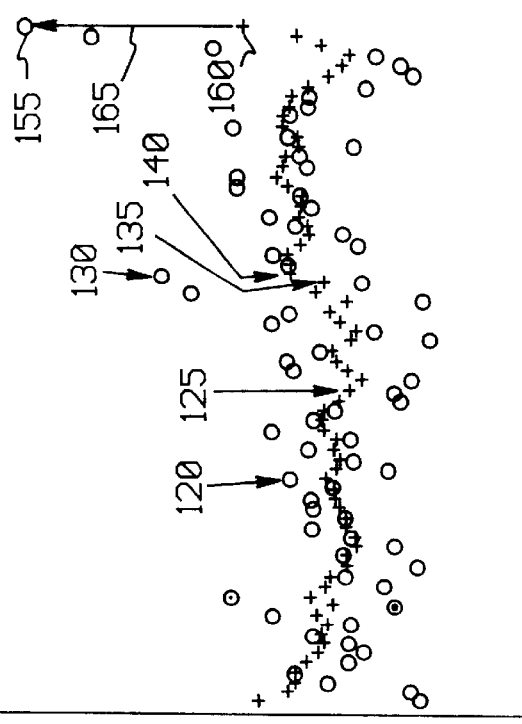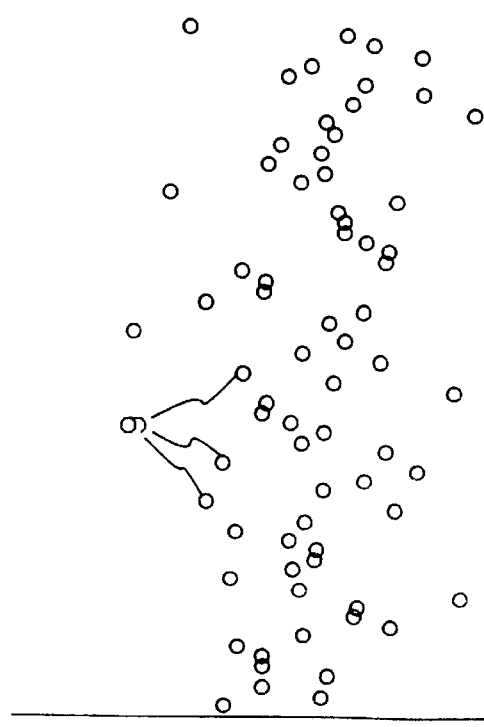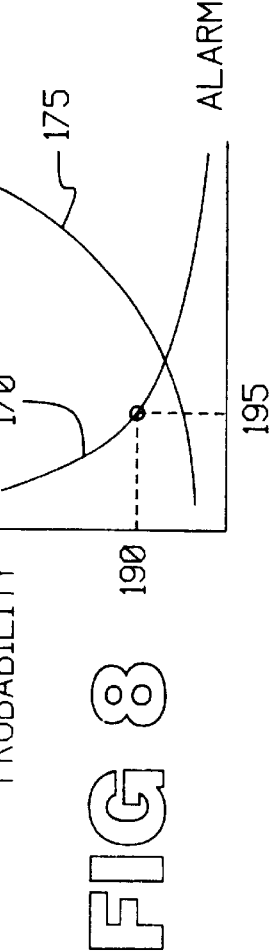

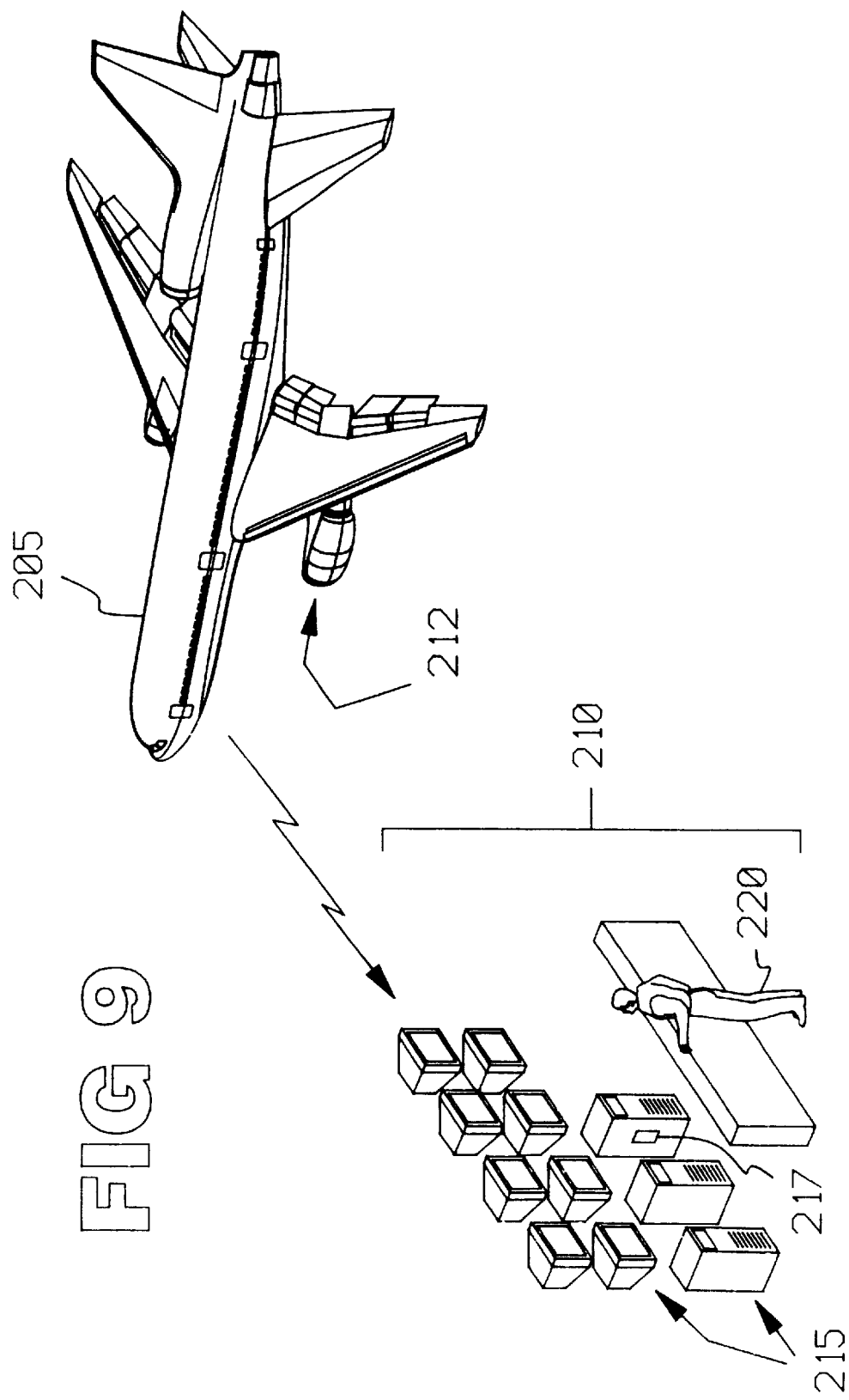

METHOD OF SETTING A TRIGGER POINT FOR AN ALARM

TECHNICAL FIELD

Parameters, such as a temperature of a component in a gas turbine aircraft engine, are commonly measured and indicated by signals which are not completely accurate, but exhibit statistical properties, such as noise. The invention concerns setting alarm points for such measured parameters.

BACKGROUND OF THE INVENTION

FIG. 1 is a schematic of a measurement system, which measures an actual parameter 3. Actual parameter 3 can, in general, be any parameter of interest, such as a temperature, dimension, acceleration, velocity, and so on. Measurement apparatus 6 produces a signal, called the measurement signal 9, which is intended to indicate the value of the actual parameter 3.

However, in many instances, the measurement signal 9 does not exactly correspond to the actual parameter 3 itself. This can occur, for example, if (1) the measurement signal 9 takes the form of an electrical voltage, and (2) the voltage is small, say in the range of millivolts. In such a case, electrical noise, due to the random thermal motion of electrons, is also present in the form of a fluctuating voltage. The measurement signal 9 will contain both (1) the voltage indicating the actual parameter 3 and also (2) the electrical noise.

Because of the noise present and other reasons, many times the measurement signal 9 will behave as a random variable. The random properties create problems when one attempts to use the measurement signal 9 to infer whether the actual parameter 3 has exceeded a limit.

A simplified example will illustrate the problem. Assume that, as in FIG. 2, the actual parameter 3 is constant. If the measurement process has Gaussian properties, then the measurement signals 9 which will be obtained will be scattered about the actual parameter 3. Circles 9 indicate generically the scattered measurement signals 9. FIG. 6, discussed later, illustrates one type of scatter in greater detail. The measurement signals 9 in FIG. 2 have a mean M and a standard deviation S.

Because of the characteristics of a Gaussian distribution, 68.2 percent of the time, the measurement signal 9 will lie between (M+S) and (M−S), that is, within one standard deviation S from the mean M. (68.2=34.1+34.1.)

The measurement signal 9 will lie between (M+S) and (M+2S) 13.6 percent of the time, and so on, as indicated for the other deviations from M.

Assume a limit 15 to exist, called an alert limit or alarm limit, which the actual parameter 3 of FIG. 1 should not exceed. Limit 15 may represent a specific speed or temperature. Clearly, a problem arises in inferring whether that limit 15 has been exceeded, based on the measurement signal 9. Even if the underlying parameter 3 is constant, as indicated, nevertheless the random properties of the measurement signal 9 can cause it to exceed limit 15. For example, measurement signal 9A exceeds the limit 15, even though the actual parameter 3 is constant, and below the limit 15.

Therefore, statistical properties of measurement signals can give false indications that a limit has been exceeded, even if all measuring equipment is operating properly.

SUMMARY OF THE INVENTION

In one form of the invention, a measurement signal is derived from a physical parameter and is compared with a limit, to infer whether the physical parameter has reached an undesirable value. If so, an alarm signal is issued. The invention sets the limit by (1) synthesizing numerous instances of the measurement signal, (2) comparing them against different limits to produce alarm signals, and (3) selecting the limit which produces alarm signals having a desired accuracy, or probability of being correct. That limit is used in practice.

BRIEF DESCRIPTION OF THE DRAWINGS

FIG. 1 illustrates a generic measurement apparatus, as found in the prior art.

FIG. 2 is a simplified illustration of how random properties of a measurement signal can falsely indicate that a limit has been exceeded.

FIG. 3 illustrates a comparator 20.

FIG. 4 illustrates a measurement signal 40, which would be applied to the + input of the comparator 20 of FIG. 3.

FIG. 5 is a flow chart illustrating processes undertaken by one form of the invention.

FIG. 6 illustrates illustrates a collection of measurement signals.

FIG. 7 illustrates a collection of synthesized measurement signals.

FIG. 8 illustrates plots of probabilities of signal validity, as a function of alarm limit.

FIG. 9 illustrates one form of the invention.

DETAILED DESCRIPTION OF THE INVENTION

A simplified form of the invention will first be explained. FIG. 3 illustrates a voltage comparator 20, which can be implemented (1) in analog form, (2) digitally, as in digital circuitry or a digital computer, or (3) in other ways.

The comparator 20 receives two inputs: a measurement signal 9 and an alarm point 30. The comparator 20 inquires whether the measurement signal 9 exceeds the alarm point 30. If so, comparator 20 produces an alarm signal on output 35, such as a signal of five volts. If not, no alarm signal is produced, and the output 35 remains at zero volts.

However, as explained above, the measurement signal 9 may possess random properties, as would occur if the measurement signal 9 contains noise. Thus, the production of an alarm signal does not necessarily indicate the presence of an alarm condition in the underlying actual parameter 3, as parameter 9A in FIG. 2 indicated.

The overall goal of the invention is to select an alarm point 30 in FIG. 3 which produces alarm signals on output 35 having a specific probability of being valid. For example, a probability of 0.10 may be chosen, meaning that ten percent of the alarm signals produced on output 35 would be valid.

This goal is attained by (1) analyzing the statistical properties of the measurement signals 9 and (2) using those properties, running computer simulations to thereby select the appropriate alarm point 30.

The Inventors point out that the alarm point 30 selected will not, in general, correspond to the actual limit 15 shown in FIG. 2. For example, assume that the actual parameter 3 in FIG. 1 is a temperature, and that this temperature should not exceed the limit of 100 degrees. Thus, line 15 in FIG. 2 would represent a limit of 100 degrees. However, in general, under the invention, the alarm point 30 in FIG. 3 will not be a voltage signal corresponding to 100 degrees.

Stated another way, comparator 20 will, in general, not inquire whether the measurement signal 9 indicates a temperature exceeding 100 degrees. Rather, comparator 20 will, when given the correct alarm point 30, produce a signal indicating, with a given probability such as ten percent, that the temperature exceeds 100 degrees. The invention selects this correct alarm point 30, in a manner which will now be described.

Assume that the actual parameter, such as the temperature just described, has the values indicated by line 40 in FIG. 4. The actual parameter is constant near a value of M, except for spikes 45. Measurement cluster 9C indicates generically the scatter of measured parameters obtained.

The goal is to reliably detect when spikes 45 exceed limit 50. The invention first determines how many spikes 45 will occur in a selected time T. In this example, five spikes 45 occur in time T. In practice, this inquiry can be done through (1) computer simulation, (2) measurement of the actual variable over all, or part, of time T, (3) a combination of (1) and (2), or (4) other approaches.

Time T may be a convenient time period, or may represent a period of special significance in the apparatus involved. For example, time T may represent the useful lifetime of the asset displaying the actual parameter 3 in FIG. 1 which the measurement signal 9 represents.

Thus, the total, or maximum, number of expected valid alarms in time T is determined. The Inventors point out that a distinction is being drawn between valid alarms and false alarms: alarms are not necessarily valid.

In a second process, the invention examines the measurement signals, represented by points 9C, and identifies the relevant statistical properties of the measurement signals 9. For example, the measurement signal 9 may be determined to be Gaussian, or approximately Gaussian, with a mean of M, and a standard deviation of S. Other types of statistical distributions are possible.

In a third process, the invention runs numerous computer simulations to produce a large sampling of data, having the same statistical properties as the measurement signals represented by signal 9C. That is, for example, a Monte Carlo process can be run to produce thousands, or millions, of random data, all Gaussian, and all with the same standard deviation S and mean of M as the measurement signals 9C.

In a fourth process, the invention simulates the operation of the comparator 20 over the period T. In this pursuit, the invention first selects an alarm point 30 in FIG. 3, which corresponds in principle, or roughly, to limit 50 in FIG. 4. However, as explained above, the two values 30 and 50 will not, in general, be identical, because the former is used to produce a value indicating a probability that limit 50 has been exceeded. After selecting an alarm point 30, the invention simulates operation of the comparator 20. For example, if the actual comparator 20 in FIG. 3 checks the measurement signal 9 twice every second and if time T in FIG. 4 is 10,000 seconds, then the invention (1) obtains 10,000 seconds' worth of the random data simulated in the third process, (2) selects 20,000 appropriate samples from the 10,000 seconds of data, and (3) applies each selected sample to the comparator 20.

Ignoring the spikes 45 for simplicity, this process will result in issuing a number of alerts. If the distribution is Gaussian, that number will depend on how far limit 50 lies from the mean of plot 40, in standard deviation units. FIG. 4, if taken as drawn to scale, would indicate that the percentage of measurement signals 9 lying above line 50 would be about one percent, and this value will be assumed for discussion purposes. Thus, in this simulation, one percent of the measurement signals 9 are found to exceed alert limit 30 in FIG. 3. About 200 alerts are produced: one percent of 20,000 equals 200. (The number of alerts will actually be somewhat greater, because the spikes 45 skew the average of the data points upward.)

However, despite the occurrence of about 200 alerts, it is known that only five actual spikes will exceed limit 50 during time T. Thus, the majority of the 200 alerts are false alerts.

Because of the high incidence of false alerts, the invention then raises the alarm point 30 in FIG. 3, and repeats the third and fourth processes. The Inventors point out that limit 50 in FIG. 4 remains the same. Also, perhaps the third process, which generates the thousands of simulations, is not repeated, but the original simulations are used again.

When the comparator 20 is now simulated for the raised alarm limit 30, the total number of alerts will be fewer, perhaps at 100 alerts.

This process is repeated: the invention continues selecting different alarm limits 30 until the total number of alerts issued for time T reaches a specific level. In this example, that level is preferably 50 alerts. The level of 50 alerts is selected because of (1) the known fact that five alarms will actually occur in time T and (2) the desired probability that the alerts will be accurate is 10 percent. Thus, the level of 50 is selected: the probability of $\frac{1}{10}$ corresponds to (5 known alerts)/(50 alerts total issued).

Once this level, or probability, is attained, the alarm limit 30 providing that ratio is used in practice, in the actual comparator 20.

Restated, in the simulations, the simulated alarm point (not shown) which is found to provide 50 total alerts in time T is used as the actual alarm point 30 in FIG. 3. Since it is known that five of the alerts will be valid, the probability that any of the 50 alerts will be valid is $\frac{1}{10}$, the desired number.

Therefore, one summary of the previous discussion is the following. Measured data having statistical properties is obtained. The statistical properties, such as (1) distribution type (such as Gaussian), (2) mean, and (3) standard deviation are obtained. These properties are used to generate synthetic measured data, over a period T.

It is known how many actual alerts A should occur during time T. The desired probability P that the issued alerts be valid is also known. Thus, the number N of alerts which should be issued in time T is given by $P = A/N$. By rearranging this equation, one sees that N should equal $A/P$ In pursuing the desired value of N, the invention selects an alarm point 30 in FIG. 3, and runs a simulation on the appropriate number of the synthesized data points within time T. If the number of alerts occurring matches N given in the equation immediately above, then that alarm point 30 is used in practice. If not, different alarm points are selected, for different simulations, until the appropriate number N is attained. Then the proper alarm point is used in practice.

In the examples given above, the mode of selecting the desired alarm limit 30 was to repeat simulations until a desired number of alarms is attained. In an alternate approach, a table of different alarm limits 30 can be generated. Simulations are run for each, thereby producing a probability of alarm validity for each.

That is, given the five possible alarms in time T shown in FIG. 4, if one simulation produces 100 alarms, its probability is $\frac{5}{100}$, and so on.

The alert limits can be tabulated, or plotted, against probabilities. A user can then select a desired probability and thereby determine the required alert limit.

The invention will be discussed in greater detail.

FIG. 5 illustrates a flow chart of processes undertaken by one form of the invention. Block 100 indicates that a collection of measurement signals for a given actual parameter are collected. FIG. 6 illustrates an example of measurement signals 9, taken over time.

In FIG. 5, block 110 indicates that relevant statistical properties of the measurement signals are derived. The mean and standard deviation of the measurement signals represent two such properties, but other derived properties can be used. A primary purpose of deriving these properties is to synthesize additional measurement signals, having the same statistical properties as the measurement signals in FIG. 6.

Block 115 in FIG. 5 indicates that thousands of simulations are run, using the statistical properties derived in block 110. In general, larger numbers of simulations provide greater accuracy, and large numbers, in the thousands or millions, are preferred. Any practical limit on the number of simulations used is imposed largely by cost, and similar factors.

FIG. 7 provides an example of the synthesized data. The circles 120 represent the synthesized data points, and the crosses 125 represent a running mean. That is, each new data point is assigned a weight, such as 0.1, and the current mean is assigned a weight such as 0.9. Each weighted new point, such as point 130, is added to the weighted previous mean, such as cross 135, to produce a new mean, indicated by cross 140.

Block 150 in FIG. 5 indicates that two particular computations are now undertaken. One is a computation of the probability of a false alarm occurring, as a function of the alert limit. The alert limit is analogous to the alarm point 30 in FIG. 3. A false alarm refers to the situation when an alarm is raised, but no danger condition occurs. That is, the actual parameter is within the acceptable alarm limits, but the measured signal indicates otherwise.

The second computation is that of the probability of a missed correct alarm occurring, as a function of the alert limit. A missed correct alarm refers to the situation when the actual parameter exceeds a limit, but no alarm is raised.

In the first computation, an alert criterion is established. For simplicity, assume that the alert criterion is simply the difference, indicated by arrow 165 in FIG. 7, between a current measured value, such as value 155, and the current mean, such as mean 160. Of course, more complex criteria can be used, since the ultimate question being asked is, "Do the measured values indicate that the actual parameter of interest is out-of-bounds?"

Arrow 165 indicates one value for the alert criterion. For that value, the probability that the alarms produced are false is computed. In this computation, each measured value, such as value 155, is compared with its respective previous mean, such as mean 160. If the value 155 exceeds the mean 160 by more than the alert criterion 165, an alarm is issued. If not, no alarm is issued.

The number of alarms issued is counted. This number is compared with the number of alarms which are valid in that time period, to determine the number of false alarms. The number of alarms which are valid is analogous to the five spike crossings of FIG. 4.

In this computation, the probability that a given alarm is valid, P(VALID), equals the quotient (number of valid alarms)/(number of alarms sounded). For example, for the alert criterion 165, if it were found that 10 alarms were issued and 3 were valid, then the probability that an alarm is valid is 3/10.

This process produces one data point in the probability plot. A different alarm criterion 165 in FIG. 7 is selected, and this process is repeated. Numerous alarm criteria 165 are selected, and the process is repeated for each. Each repetition produces a point in the probability plot.

The overall result is to attain a plot of (1) probability that the alarms produced are non-valid against (2) level of the alarm criterion 165. FIG. 8 illustrates such a plot 170.

A similar process is undertaken to obtain a plot of (1) probability that the alarms produced are missed alarms against (2) level of the alarm criterion 165. This type of plot is labeled as 175 in FIG. 8.

The Inventor points out that, in FIG. 8, as the alarm limit increases, the probability that a given alarm is false decreases, as indicated by plot 170. One way to view this phenomenon is to look at an extreme case: if the alert limit 165 in FIG. 7 were extremely high, it is highly unlikely that statistical deviation of a measured value would cause the alert to be issued. That is, the probability of the measured value lying 10 standard deviations away from the mean is very small. Thus, if such a measured value is encountered, it is probably not a statistical phenomenon, and the ensuing alert is probably valid also.

Once the probability data of FIG. 8 is obtained, a probability is selected, such as point 190, and the corresponding alarm criterion 195 in this case, is selected and used in practice.

A significant feature of the invention is that it reduces the number of false alerts. However, it does so in a systematic manner, as described above. An alternate approach would empirical: (1) adjust the alarm point 30 in the physical apparatus of FIG. 3, (2) measure P(TRUE) of the resulting alerts, (3) if P(TRUE) is insufficiently close to a desired value, adjust the alarm point 30 again, and so on.

The invention specifically prefers to avoid this cut-and-try approach. In a sense, the invention performs an a priori approach, while the cut-and-try approach is a posteriori.

From another perspective, the invention utilizes an estimated probability to set the alarm limit, rather than an empirically measured probability.

The invention sets the alert limit based on the probabilities discussed above. In the case of a gas turbine engine, those probabilities are derived for a given specific engine, or a class of engines. Those probabilities include actual data about the physical behavior of the engine. However, the data can also be obtained from computer simulations, as opposed to physical measurements.

FIG. 9 illustrates a specific implementation of one form of the invention. Measured data is gathered by equipment (not shown) within an airborne aircraft 205, and transmitted to a base station 210. The measured data may be raw data, or may be processed. For example, many parameters in the engine 212 are not measured directly, but are computed based on other parameters. The margin for exhaust gas temperature, EGT, is one such processed parameter.

Base station 210 contains a computer system 215 which implements the processes described above, which set alert limits for some, or all, of the parameters received from the aircraft 205. Block 217 represents hardware and software which implements the processes. As explained above, the alert limits are set so that the resulting alerts, or alarms, when they occur, have a desired probability of being accurate. Ten percent is a desired probability, although probabilities in the range of 5 to 20 are considered useful.

Other embodiments of the invention specifically include probabilities from ten percent to 100 percent.

When an alert having the desired probability of validity is detected, an alarm is raised, informing a human operator 220 of the alert. The human operator 220 then evaluates the situation.

The preceding discussion presumed that the alarm point, or alarm criterion, represented by alarm point 30 in FIG. 3, was computed in advance, and then used on a permanent basis. However, that is not required. The computations represented by the processes in FIG. 6 can be can be done in real time. In such a case, the alert limit, represented by input 30 in FIG. 3, will, in general, change as time progresses.

Comparator 20 in FIG. 3 can represent an actual comparator. In the more general case, comparator 20 represents the process of evaluating the alert criterion, represented by arrow 165 in FIG. 7.

Measurement signal 9 in FIG. 3 can be said to nonexactly represent the actual parameter 3. Alternately, measurement signal 9 can be said to indicate the actual parameter 3 with statistical accuracy or measurable statistical accuracy. Alternately, measurement signal 9 can be said to indicate the actual parameter 3 with statistical deviation or measurable statistical deviation. As yet another alternate, measurement signal 9 can be said to indicate the actual parameter 3 with a measurable mean and standard deviation, if those terms apply.

The concept of evaluating the probability that an issued alarm is valid was discussed above. This concept can be expressed in different terminology, such as evaluating the accuracy of the issued alarm. An issued alarm having a high probability of accuracy can be said to be more accurate, as when, for example, 9 alarms out of 10 are accurate. Conversely, an issued alarm having a low probability of accuracy can be said to be less accurate, as when, for example, 1 alarm out of 100 are accurate.

In some cases, accuracy can be defined numerically, as being identical to the probability of validity. In this case, an accuracy of 0.1 would mean that a probability of 0.1 exists that a given alarm is valid.

Numerous substitutions and modifications can be undertaken without departing from the true spirit and scope of the invention. What is desired to be secured by Letters Patent is the invention as defined in the following claims.

What is claimed is:

1. In a process which (1) monitors a physical parameter,
   (2) develops a signal indicating behavior of the physical parameter, and
   (3) issues an alert, which is either valid or invalid, when the signal reaches an implemented alert limit, a method of establishing said implemented alert limit, comprising:

a) estimating the maximum possible number of valid alert limits, MAX, in a time T;
   b) finding a test alert limit having the following properties:
      i) when applied to simulations of said signal in a simulated time period T, the test alert limit produces a number of invalid alerts N; and
      ii) the ratio MAX/N is greater than 0.05; and
   c) using the test alert limit which was found as the implemented alert limit.

2. Method according to claim 1, wherein the ratio MAX/N equals 1/20.

3. Method according to claim 1, wherein the ratio MAX/N equals 1/10.

4. Method according to claim 1, wherein the number of valid alerts is known or specified, but not estimated by the simulations.

5. In a process which (1) monitors a signal, and
   (2) issues an alert when the signal reaches a specified alert limit, wherein some alerts are valid and some are invalid, a method of establishing said specified alert limit, comprising:

a) examining several collections of alerts caused by respective alert limits, by running Monte Carlo computer simulations of the signal;
   b) from the several collections, selecting a candidate collection in which the alerts are more than five percent valid; and
   c) using the alert limits corresponding to the candidate collection as the specified alert limit.

* * * * *